United States Patent Office 3,528,503
Patented Sept. 15, 1970

3,528,503
METHOD OF IMPROVING PERMEABILITY OF GEOLOGIC FORMATIONS BY REMOVAL OF ORGANIC MATERIAL THEREFROM
Curtis Wendell Crowe, Tulsa, Okla., assignor to The Dow Chemical Company, Midland, Mich., a corporation of Delaware
No Drawing. Filed July 30, 1968, Ser. No. 748,654
Int. Cl. E21b 43/27
U.S. Cl. 166—300    7 Claims

ABSTRACT OF THE DISCLOSURE

In the treatment of a geologic formation penetrated by a wellbore wherein the porosity of the formation has been impaired by deposition of organic material especially bacterial deposits and more especially in such treatment wherein there is employed a unit flooding production system comprising at least one injection well and at least one production well, the improvement consisting essentially of admixing and injecting an aqueous solution of an oxidizing agent selected from permanganic acid, water-soluble salts thereof, or mixtures of such acid and/or salts, and thereafter injecting an aqueous acid solution preferably followed by a water brine or inert gas flushing fluid. A preferred practice is to inject a substantially inert spacer fluid and/or spacer plug following the injection of the oxidizing agent and prior to the injection of the acid.

---

The invention relates to an improved flooding operation.

The principal object of the invention is to solubilize and remove organic deposits from a porous fluid-bearing geologic formation thereby to improve the permeability of the formation and, accordingly, increase the production therefrom and decrease the cost of such production. A principal advantage of the invention is the fast action in solubilizing and thereby providing quick removal of the bacterial residue while equipment and personnel are at a well site.

In copending patent application S.N. 628,850, filed Apr. 6, 1967, there is described a method of removing organic material, particularly bacterial deposits from such formation, by injecting thereinto an aqueous solution of a hypochlorite containing a soluble hydroxide. It has subsequently been discovered that a specific type of oxidizing agent which had upon first evaluation indicated marginal or no beneficial effect (when injected into a formation plugged to an objectionable extent by organic material) to be highly beneficial for the removal of such material when such injection was followed by injection of an aqueous mineral acid solution. Also, as a separate invention, there is filed concurrently herewith application S.N. 748,649, directed to a method of removing such organic material due substantially to bacterial deposits where a peroxide, preferably of a pH greater than 6, followed by an acid is employed.

The invention is carried out by injecting an aqueous solution of permanganic acid or a water-soluble salt thereof, e.g., $KMnO_4$, at a pressure which is not sufficiently great to fracture the formation; preferably following such injection with a sufficient amount of an inert liquid or gas, e.g., water, brine $CO_2$, nitrogen, or the like as a spacer fluid; and thereafter injecting an aqueous solution of an acid having an ionization constant of at least $1 \times 10^{-5}$; and thereafter preferably flushing the residual treating materials by injecting a water, brine, or gas flushing fluid.

The amount of the permanganic acid or salt thereof to employ in the practice of the invention is between about 0.1 and 50.0 percent by weight of the aqueous solution employed. The preferred limits thereof to employ are between about 2.0 and 20.0 percent by weight of the aqueous solution employed. Lesser amounts than 0.1 percent do not achieve the desired objectives of the invention to the extent desired. Greater than 50.0 percent tends to produce excessive heat in the formation.

It is recommended in the practice of the invention that the pH value of the permanganic acid or permanganate solution be raised to a value somewhat above its usual value as by the admixture therewith of an alkaline material, e.g., NaOH, i.e., above a pH of 6, say between about 7 and about 12.

The following examples are illustrative of the practice of the invention:

COMPARATIVE TEST A AND B AND EXAMPLES 1 AND 2

The examples were conducted in accordance with the following procedure:

Sandstone cores containing some limestone were of about 1 inch in diameter and 3 inches in length were cut and placed in a Hassler sleeve which consisted essentially of a device whereby a liquid is injected into the end of cylindrical core and forced out the opposite end thereof without being permitted to pass along the circumferential surface thereof and wherein a measured pressure is employed to force the fluid therethrough and the amount of fluid forced therethrough at a specific pressure as collected and measured. A discussion of a Hassler sleeve may be found in the literature, e.g., in Oil Reservoir Engineering by Pirson, pages 74 to 77, inclusive, published by McGraw-Hill, N.Y. (1953).

After the injection of each fluid during each test, the permeability was measured.

In each test the core was first treated with a 15 percent by weight hydrochloric acid solution until a constant flow rate was established. The initial injection of acid is not essential to the practice of the invention, but used in the tests to aid in rendering the sample cores substantially uniform. It was thereafter damaged by forcinng thereinto a bacterial residue carried in a 3 percent by weight NaCl brine. The damage was of such nature that only 10 percent of the initial permeability was retained (i.e., it was 90 percent plugged).

Following this damage step, an aqueous solution containing permanganic acid or a water-soluble permanganate salt was forced into and axially through the core held in the Hassler sleeve until a substantially constant rate of flow was established. Following the treatment by the oxidizing agent, an aqueous solution of a mineral acid was forced similarly axially through the core. This was continued until a more-or-less constant rate of flow was established and such rate of flow was compared to each of the flow through both the initial undamaged core and through the bacteria-damaged core. In some instances a small amount of sodium hydroxide was admixed with the permanganic acid or permanganate solution and exhibited a beneficial effect. The same effect is obtained by passing an aqueous solution of NaOH or KOH through the core immediately or shortly after the permanganic acid or salt thereof.

The salient procedural steps in the individual tests and the results are shown in Table I.

TABLE I

[Conditions: 150° F. and 60 p.s.i.g.]

| Test or example | Aqueous oxidizing solution used | Results obtained | | |
|---|---|---|---|---|
| A | 5% KMnO$_4$ | Organic residue disintegrated in 4 hours. | | |
| B | 5% KMnO$_4$ and 2% NaOH | Residue disintegrated in 30 minutes but permeability was very low indicating almost complete plugging. | | |
| | | | Resulting permeability in millidarcy | Percent of original permeability |
| 1 | 15% HCl | | 197 | |
| | Bacterial dispersion | | 22 | 11 |
| | 5% KMnO$_4$, 2% NaOH | | 7 | 4 |
| | 15% HCl | | 136 | 69 |
| 2 | 15% HCl | | 142 | |
| | Bacterial dispersion | | 14 | 10 |
| | 5% KMnO$_4$ | | 3 | 2 |
| | 15% HCl | | 85 | 60 |

An observation, indicating marked superiority of the practice of the invention was the improved permeability of the cores upon first contact with the permanganate and continued improvement during the test.

Reference to Table I shows that when the potassium salt of permanganic acid with or without NaOH, when followed by an aqueous acid solution, largely restores the permeability which existed prior to the injection of the plugging bacterial dispersion.

COMPARATIVE TESTS C TO E

The following tests were conducted for comparative purposes to show that other oxidizing agents when employed instead of the permanganic acid or salt thereof, but in a similar manner, the results are unacceptable. Cores were employed in the manner of the tests and examples shown in Table II.

TABLE II

[Conditions: 150° F. at 60 p.s.i.g.]

| Test No. | Aqueous solution employed | Resulting permeability | Resulting percent of original permeability |
|---|---|---|---|
| C | 15% HCl | 126 | |
| | Bacterial dispersion | 14 | 11 |
| | 4% sodium perborate | 3 | 2 |
| | 15% HCl | 7 | 6 |
| D | 15% HCl | 173 | |
| | Bacterial dispersion | 20 | 12 |
| | 5% chromium trioxide | 10 | 6 |
| | 15% HCl | 51 | 29 |
| E | 15% HCl | 193 | |
| | Bacterial dispersion | 22 | 11 |
| | 15% HCl | 47 | 24 |

The following tests were performed by placing a 1-gram sample of the bacterial plugging material in each of a series of test tubes at 70° F. and then admixing therewith 5% by weight aqueous solution of the oxidizing agents (with or without a 2% NaOH solution) as set out in Table III.

TABLE III

| Test No. | Aqueous solution employed | Results obtained |
|---|---|---|
| F | 5% chromium trioxide | Residue disintegrated in 24 hours. |
| G | 5% potassium persulfate | No appreciable change in 24 hours. |
| H | 5% potassium persulfate plus 2% sodium hydroxide. | Residue partially disintegrated in 24 hours |
| I | 5% sodium bromate | No appreciable change in 24 hours. |
| J | 5% sodium bromate plus 2% sodium hydroxide. | No appreciable change in 24 hours. |
| K | 5% nitric acid | No appreciable change in 24 hours. |
| L | 5% sodium chlorate | No appreciable change in 24 hours. |
| M | 5% sodium chlorate plus 2% sodium hydroxide. | No appreciable change in 24 hours. |
| N | 5% sodium dichromate | No appreciable change in 24 hours. |
| O | 5% sodium dichromate plus 2% sodium hydroxide. | Residue disintegrated in 24 hours. |

Reference to Tables II and III show that agents commonly effective as oxidizing agents for general use are unsatisfactory for use in the practice of the invention whether or not used in conjunction with an acid.

When such oxidizing agents were followed by an aqueous solution of an acid, the results were insufficiently improved to be acceptable.

Having described my invention, what I claim and desire to protect by Letters Patent is:

1. The method of improving the permeability of a porous geologic formation damaged by the deposition of organic materials lodged in pores thereof comprising injecting in sequence into the formation (1) about a 0.1% to 50.0% by weight aqueous solution of a manganese compound selected from the class consisting of permanganic acid and water-soluble permanganates and (2) an aqueous solution of an acid having an ionization constant of at least about $1 \times 10^{-5}$.

2. The method according to claim 1 wherein the manganese compound is KMnO$_4$.

3. The method according to claim 2 wherein the KMnO$_4$ is present in a 2.0% to 20.0% aqueous solution thereof.

4. The method according to claim 1 wherein a fluid substantially inert to the manganese compound and to the acid is injected as a spacing agent following injection of the manganese compound and prior to injection of the acid.

5. The method according to claim 1 wherein a sliding separatory plug is inserted following the injection of the manganese compound and prior to the injection of the acid.

6. The method according to claim 1 wherein a displacing fluid, substantially unreactive with the acid is injected into the formation following the injection of the acid.

7. The method according to claim 1 wherein the pH value of said aqueous solution of a manganese compound is raised above 6.

References Cited

UNITED STATES PATENTS

| | | | |
|---|---|---|---|
| 2,481,422 | 9/1949 | Haynes et al. | 166—156 |
| 2,768,694 | 10/1957 | Moll et al. | 166—307 |
| 2,900,026 | 8/1959 | Trusheim | 166—312 X |
| 3,342,262 | 9/1967 | King et al. | 166—300 X |

NILE C. BYERS, JR., Primary Examiner

I. A. CALVERT, Assistant Examiner